United States Patent
Boutaghou et al.

(10) Patent No.: US 7,239,485 B2
(45) Date of Patent: Jul. 3, 2007

(54) LOCALIZED HEATING ELEMENT FOR A SUSPENSION ASSEMBLY

(75) Inventors: Zine-Eddine Boutaghou, North Oaks, MN (US); Roger Lee Hipwell, Jr., Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 316 days.

(21) Appl. No.: 10/645,815

(22) Filed: Aug. 21, 2003

(65) Prior Publication Data
US 2005/0039325 A1 Feb. 24, 2005

(51) Int. Cl.
*G11B 21/16* (2006.01)

(52) U.S. Cl. .................................. 360/245.9

(58) Field of Classification Search ............ 360/245.9, 360/234.5, 234.6, 264.2, 266.3, 244.1, 294.7; 369/44.19; 156/273.9, 274.8; 174/254
See application file for complete search history.

(56) References Cited

U.S. PATENT DOCUMENTS

| | | | |
|---|---|---|---|
| 4,871,899 A | 10/1989 | DuFrenne | 219/233 |
| 5,107,078 A * | 4/1992 | Marion et al. | 174/254 |
| 5,421,943 A * | 6/1995 | Tam et al. | 156/273.9 |
| 5,699,212 A | 12/1997 | Erpelding et al. | 360/104 |
| 5,757,585 A | 5/1998 | Aoyagi et al. | 360/104 |
| 5,796,549 A | 8/1998 | Sedbrook et al. | 360/103 |
| 5,835,306 A | 11/1998 | Bennin | 360/104 |
| 6,002,550 A * | 12/1999 | Amemiya et al. | 360/234.5 |
| 6,078,473 A | 6/2000 | Crane et al. | 360/104 |
| 6,318,624 B1 | 11/2001 | Pattanaik et al. | 228/56.3 |
| 6,349,017 B1 * | 2/2002 | Schott | 360/234.6 |
| 6,460,755 B1 | 10/2002 | Inoue et al. | 228/246 |
| 6,543,677 B2 | 4/2003 | Pattanaik et al. | 228/246 |
| 6,704,256 B2 * | 3/2004 | Berg et al. | 369/44.19 |
| 6,707,646 B2 * | 3/2004 | Berger et al. | 360/294.7 |
| 2001/0030836 A1 * | 10/2001 | Katsumata | 360/244.1 |
| 2002/0057531 A1 | 5/2002 | Segar et al. | 360/234.5 |
| 2002/0113115 A1 | 8/2002 | Satoh et al. | 228/41 |

OTHER PUBLICATIONS

Cheng et al., "Localized Silicon Fusion and Eutectic Bonding for MEMS Fabrication and Packaging", 2000 IEEE Journal of Microelectromechanical Systems, vol. 9, No. 1, pp. 3-8, Mar. 2000.

* cited by examiner

*Primary Examiner*—Tianjie Chen
(74) *Attorney, Agent, or Firm*—Todd R. Fronek; Westman Champlin & Kelly P.A.

(57) ABSTRACT

The present invention provides a suspension assembly having a slider body with a trailing edge face. A bond pad is positioned on the trailing edge face and a conductive trace is connected to the bond pad to form an electrical connection. A heating element includes a low resistivity portion and a high resistivity portion. The high resistivity portion is positioned proximate the electrical connection.

26 Claims, 5 Drawing Sheets

LOCALIZED HEATING ELEMENT FOR A SUSPENSION ASSEMBLY

FIELD OF THE INVENTION

The present invention relates generally to providing an electrical connection between a conductive trace and a bond pad, and more particularly but not by limitation to a heating element for providing the electrical connection.

BACKGROUND OF THE INVENTION

Air bearing sliders have been extensively used in disc drives to appropriately position a transducing head above a rotating disc. The transducing head is typically carried by the slider. Conventionally, head positioning is accomplished by operating an actuator arm with a large-scale actuation motor, such as a voice coil motor (VCM), to radially position the slider over a track on a disc. Typically, disc drive systems include a suspension assembly attached to the actuator arm for supporting and positioning the slider. The suspension assembly includes a load beam attached to the actuator arm and a gimbal disposed at the opposite end of the load beam. A flex circuit material is attached to the gimbal and the actuator arm. The air bearing slider carrying the transducing head is mounted to the flex circuit material. This type of suspension assembly is used with both magnetic and nonmagnetic discs. The VCM rotates the actuator arm and the suspension assembly to position the transducing head over a desired radial track of the disc.

In order for the disc drive to read and write data from the transducing head, conductive traces are disposed along the flex circuit material of the suspension assembly for the disc drive to electrically communicate with the slider. The traces extend along the gimbal and end at flex on suspension (FOS) bond pads formed adjacent to the slider. The slider has a forward face with bond pads disposed on the forward face such that an electrical connection can be made between the traces and the slider. Typically gold ball bonds are used to provide the connection between the FOS bond pads and the slider bond pads. In general, external solder bonders and ultrasonic bonding equipment is used to heat the ball bonds to cause sufficient reflow of the bonds to create an interconnect between the FOS bond pads and the slider bond pads. Difficulties arise in aligning and providing external heating systems to cause reflow of the ball bonds, and consequently a weak interconnect can result. A weak interconnect leads to an increased potential failure mode of the electrical connection between the slider bond pads and the FOS bond pads. Embodiments of the present invention address to these and other problems, and offer other advantages over the prior art.

SUMMARY OF THE INVENTION

The present invention provides a suspension assembly having a slider body with a trailing edge face. A bond pad is positioned on the trailing edge face and a conductive trace is connected to the bond pad to form an electrical connection. A heating element includes a low resistivity portion and a high resistivity portion. The high resistivity portion is positioned proximate the electrical connection. Furthermore, an insulating component is positioned between the conductive trace and the heating element proximate the electrical connection. In a further embodiment, the high resistivity portion has a smaller thickness then the low resistivity portion and can include an undulating pattern positioned proximate the bond pad. In another aspect, the conductive trace and the heating element can be positioned within a flex circuit.

A further embodiment of the present invention relates to a method for providing an electrical connection. The method includes providing a flexible circuit and positioning a heating element and a conductive trace within the flexible circuit. A slider having a bond pad is also provided. Furthermore, the method includes heating a bonding component with the heating element to provide an electrical conduit between the conductive trace and the bond pad. In another aspect, a current can be applied to the heating element and the heating element can be insulated from the conductive trace. Other features and benefits that characterize embodiments of the present invention will be apparent upon reading the following detailed description and review of the associated drawings.

BRIEF DESCRIPTION OF THE DRAWINGS

FIGS. 4-1 and 4-2 are schematic views of a slider according to an embodiment of the present invention.

FIGS. 5-1 and 5-2 are schematic views of a slider according to another embodiment of the present invention.

DETAILED DESCRIPTION OF ILLUSTRATIVE EMBODIMENTS

Figure 1:
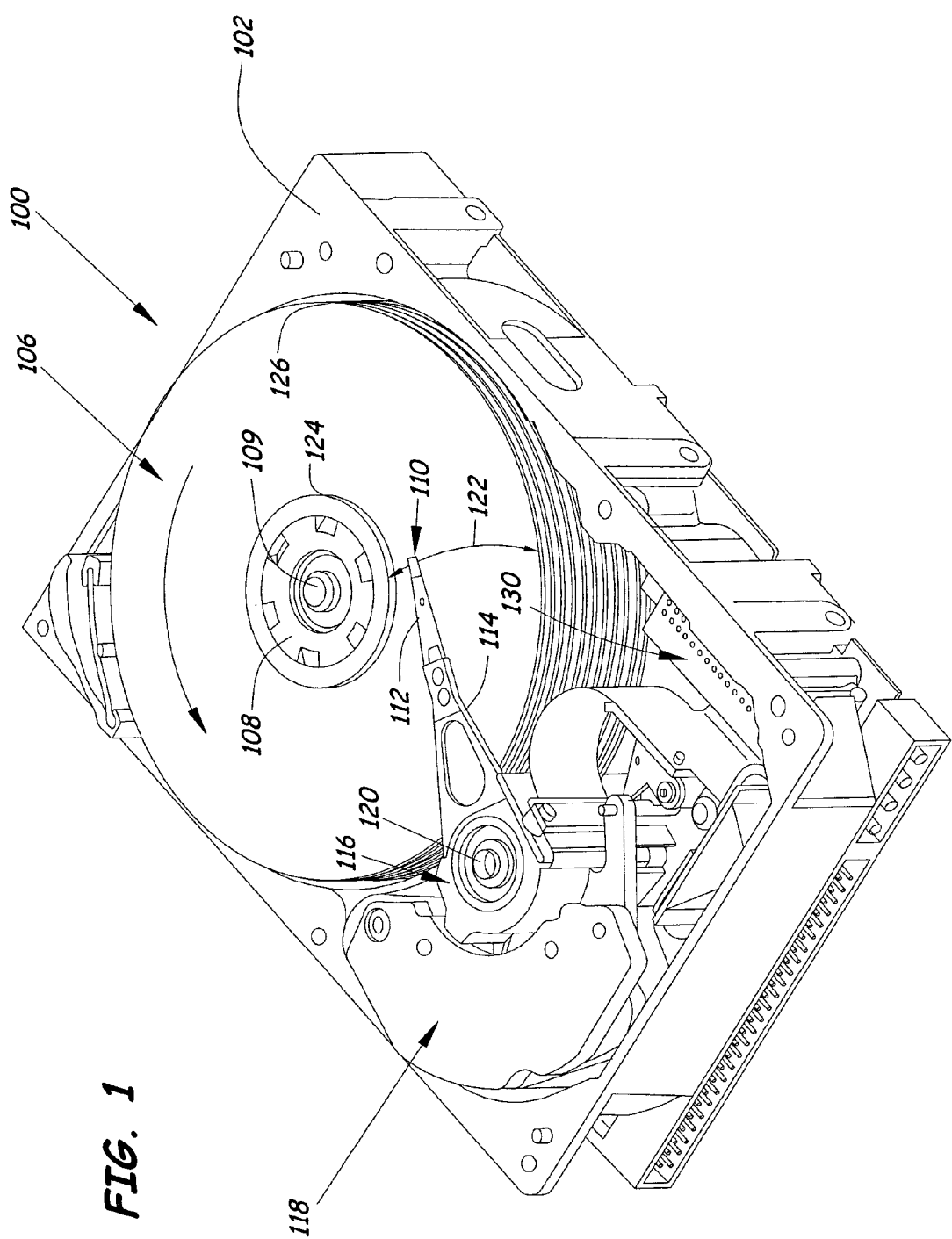
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
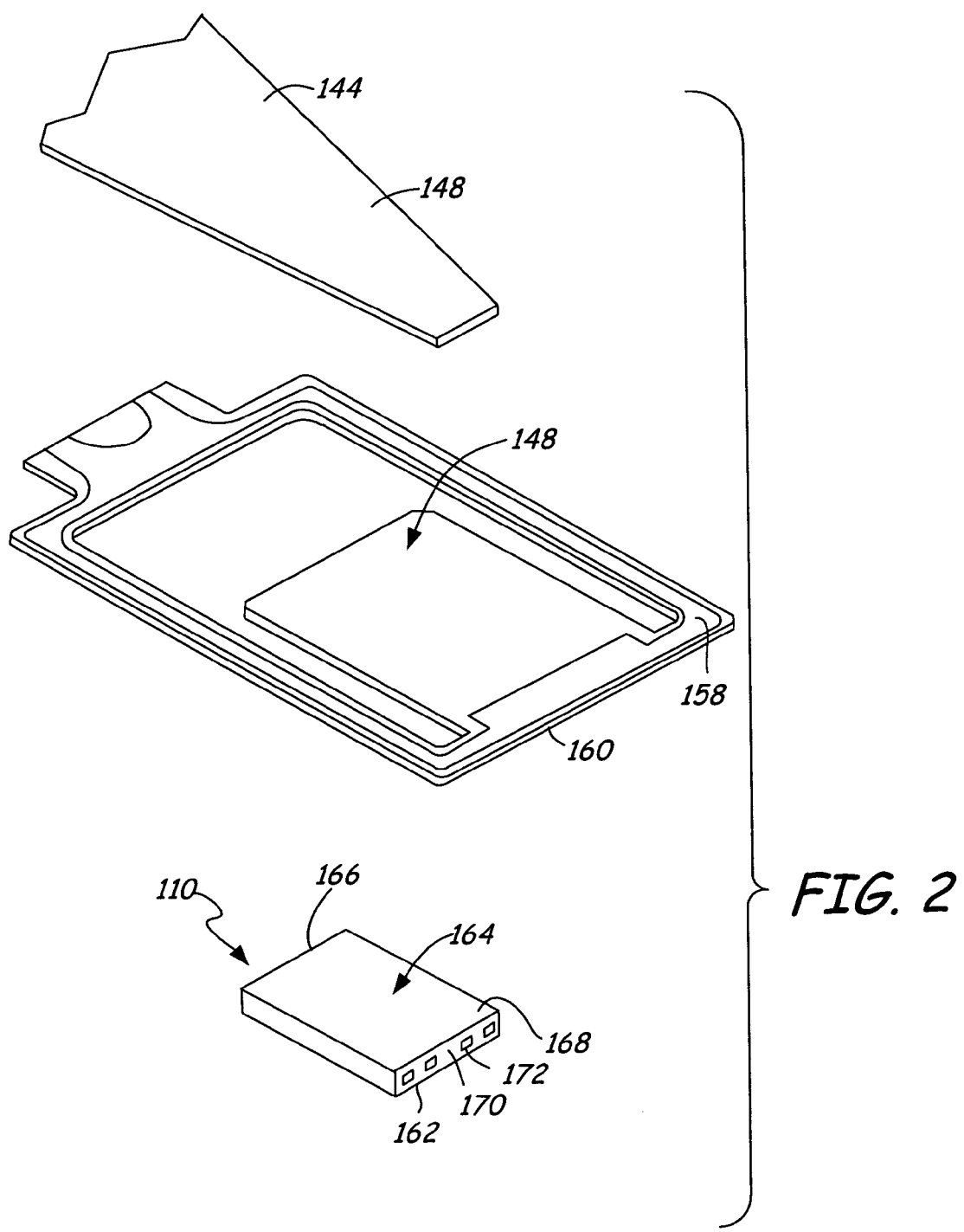
FIG. 2 is an exploded perspective view of a distal end of a suspension.

FIG. 2 is an exploded perspective view of the distal end portion of suspension 112. Shown in FIG. 2, from top to bottom are load beam 144, gimbal 148 and slider 110. Gimbal 148 is attached to load beam 144. A flex circuit material 158 is attached to a slider-opposing face 160 of gimbal 148. Slider 110 attaches to flex circuit material 158 and is positioned on gimbal 148. Flex circuit material 158 provides a spring connection between slider 110 and load beam 144. As discussed below, flex circuit material 158 can include conductive traces for communication between slider 110 and electronics 130 and a heating element to provide heat to a bonding component that provides an electrical conduit between bond pads on the slider and the conductive traces.

Slider 110 includes a disc opposing face 162 and a gimbal opposing face 164, which is attached to the slider opposing face 160 on the bottom surface of gimbal 148. Slider 110 has a leading edge 166 and a trailing edge 168. A forward face 170 is disposed on trailing edge 168 of slider 110. Forward face 170 extends between the disc opposing face 162 and gimbal opposing face 164. Slider bond pads 172 are formed on the forward face 170 of slider 110.

Gimbal 148 is configured to allow slider 110 to move in pitch and roll directions to compensate for fluctuations in the spinning surface of a disc. A transducing head (not shown) is located on disc opposing face 162 of slider 110 proximate to trailing edge 168. In operation, load beam 144 and gimbal 148 carrying slider 110 move together as coarse positioning is performed by VCM 118 (FIG. 1) to rotate actuator arm 114 (FIG. 1).

Figure 3:
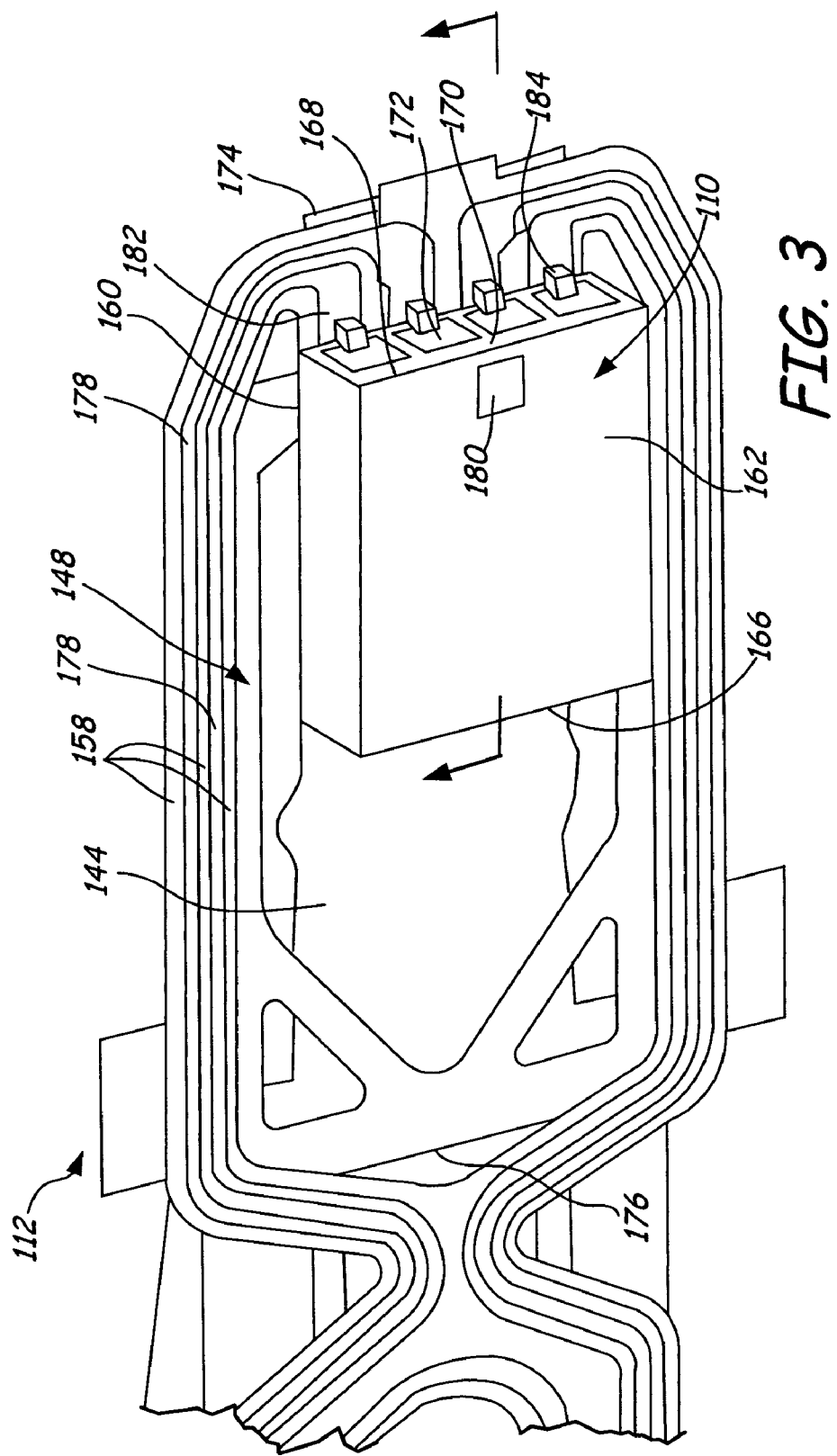
FIG. 3 is a bottom perspective view of a distal end of a suspension.

FIG. 3 is a perspective view of a disc opposing surface of the distal end portion of suspension 112. Gimbal 148 is attached to load beam 144. Gimbal 148 has a front edge 174 and a rear edge 176. The rear edge 176 is attached to load beam 144. Flex circuit material 158 is disposed on slider opposing face 160 of gimbal 148. In the embodiment of gimbal 148, flex circuit material 158 is disposed on gimbal 148 where the slider 110 attaches. Flex circuit material 158 generally travels along the underside of gimbal 148, load beam 144, and along the length of the actuator arm 114 all the way to circuitry located in another part of the disc drive (not shown). Flex circuit material 158 on slider opposing face 160 of gimbal 148 engages gimbal opposing face 164 (FIG. 2) of slider 110.

A trace layer 178 is disposed upon flex circuit material 158. Trace layer 178 completes a circuit connection between the electronic components of the disc drive and the transducing head 180 carried by slider 110. Trace layer 178 travels along the underside of gimbal 148, load beam 144 and along the length of the actuator arm 144 on top of flex circuit material 158. Trace layer 178 can be made of copper with gold plated on top of the copper layer. Each trace 178 ends at a flex on suspension (FOS) bond pad 182. In an exemplary embodiment there is at least one FOS bond pad 182 located on flex circuit material 158 for each slider bond pad 172 located on slider 110. FOS bond pads 182 are located proximate to front edge 174 of gimbal 148 and forward of where slider 110 is attached to gimbal 148.

Slider 110 has a disc opposing face 162 (as viewed in FIG. 3 on the bottom of slider 110) and gimbal opposing face 164 (as viewed in FIG. 2 on the top of slider 110). Gimbal opposing face 164 is attached to gimbal 148 on slider opposing face 160 (as viewed in FIG. 3 on the bottom of gimbal 148) of gimbal 148. The transducing head 180 is located on disc opposing face 164 of slider 110. When slider 110 is attached to gimbal 148, forward face 170 of slider 110 is located proximate and substantially parallel to front edge 174 of gimbal 148. Thus, slider bond pads 172 located on forward face 170 of slider 110 are positioned proximate to FOS bond pads 182. An adhesive (not shown) is used to bond slider 110 to gimbal 148. During operation, when slider 110 flies above the disc, slider 110 typically possesses three primary degrees of movement, which are vertical motion, pitch and roll rotation.

When slider 110 is attached to gimbal 148, the slider bond pads 172 are aligned with FOS bond pads 182 of gimbal 148. A bonding component (for example solder, gold, etc.) 184 can be patterned on each FOS bond pad 182. Bonding component 184 is bonded to slider bond pad 172 and its respective FOS bond pad 182 to create an electrical connection between slider 110 and trace layer 178. Bonding component 184 act as an electrical conduit and complete the electrical connection between slider 110 and trace layer 178. In accordance with an embodiment of the present invention a localized heating element is integrated into flex circuit 158 on the underside of trace 178 to provide localized heating to bonding component 184.

Figures 1, 4:
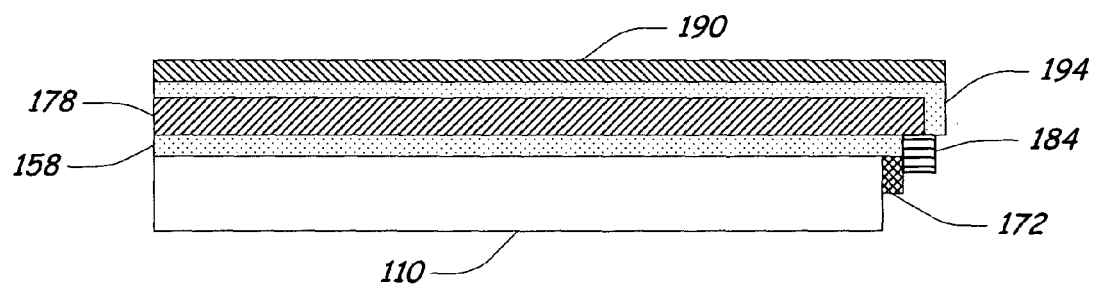
Figures 2, 4:
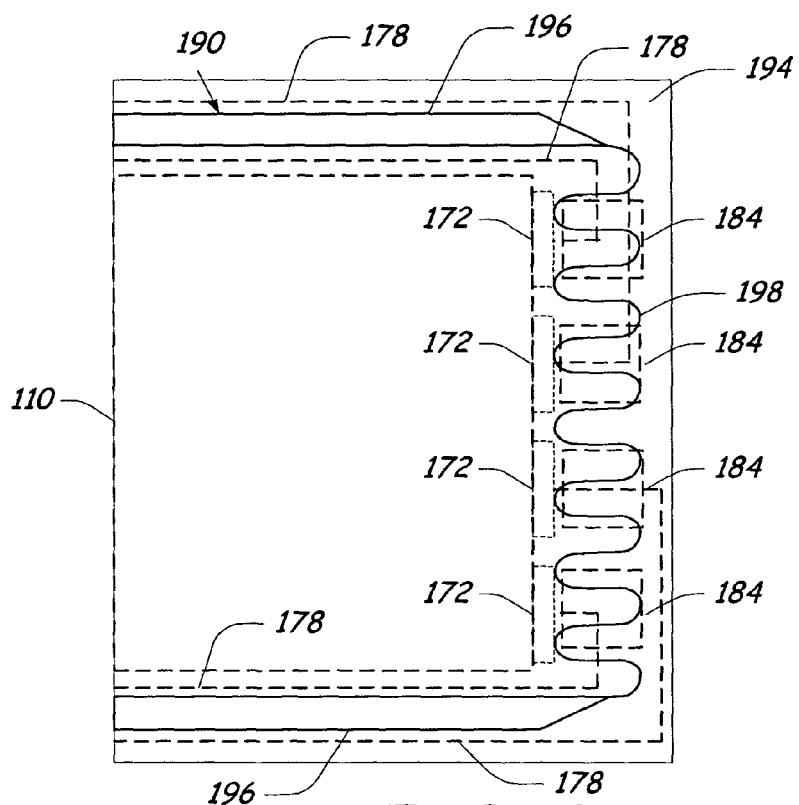

FIGS. 4-1 and 4-2 illustrate a schematic side view and a top view of a localized heating element for providing heat to provide an electrical connection between the trace on the flex circuit and bond pads on the slider. As illustrated in FIG. 4-1, trace 178 is disposed in flexible circuit 158, which is attached to slider 110. A heating element 190 is adapted to heat bonding component 184 in order to form an electrical connection between bond pads 172 and trace 178 when current is passed through heating element 190. An insulating component 194 is positioned between trace 178 and heating element 190 to prevent trace 178 and/or bond pad 172 from an electrical short. Insulating component 194 can be integrated within flexible circuit 158 either in a separate layer or share a layer with trace 178. As illustrated in FIG. 4-2, heating element 190 includes two low resistivity portions 196 arranged on opposing sides of slider 110. A high resistivity portion 198 is positioned between the two low resistivity portions 196. When a current is applied to heating element 190, current flows rather easily through low resistivity portions 196. In high resistivity portion 198, increased resistance in the portion 198 provides sufficient heat to cause reflow of bonding component 184 such that an electrical connection is formed between respective trace 178 and associated bond pads 172. In the embodiment illustrated, high resistivity portion 198 has a smaller thickness than low resistivity portions 196. Additionally, an undulating pattern in high resistivity portion 198 increases the surface area in which heat can be applied to bonding component 184.

It will be appreciated that heating element 190 can be integrated into the same flexible circuit that holds trace 178. The flexible circuits may be a single layer or multiple layers containing an insulating component (such as a polyimide) positioned between heating element 190 and trace 178. By integrating heating element 190 within flex circuit 158, an improved method of providing reflow to bonding component 184 is realized. Heating element 190 can be easily manufactured using conventional depositing techniques for depositing wires upon a flexible circuit. Additionally, heating element 190 can be manufactured such that the undulating portions of low resistivity element 198 are positioned proximate slider bond pads 172, FOS bond pads 182 and bonding components 184. As a result, an involved alignment process for aligning a heating element (for example an external heating element) proximate the bond pads and bonding component is not necessary. Instead, a single flexible circuit (either single or multi layer) can provide heating element 190 aligned with respective conductive traces 178 and the bond pads. Furthermore, bonding components 184 can be deposited directly onto FOS bond pads 182 so that alignment of bonding components can easily be performed.

Figures 1, 5:
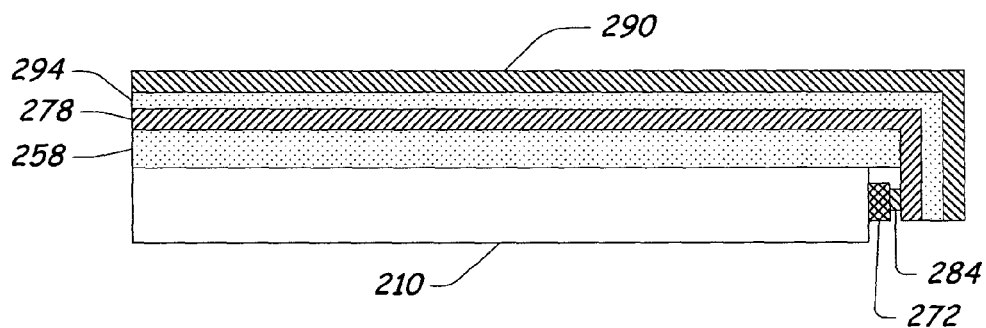
Figures 2, 5:
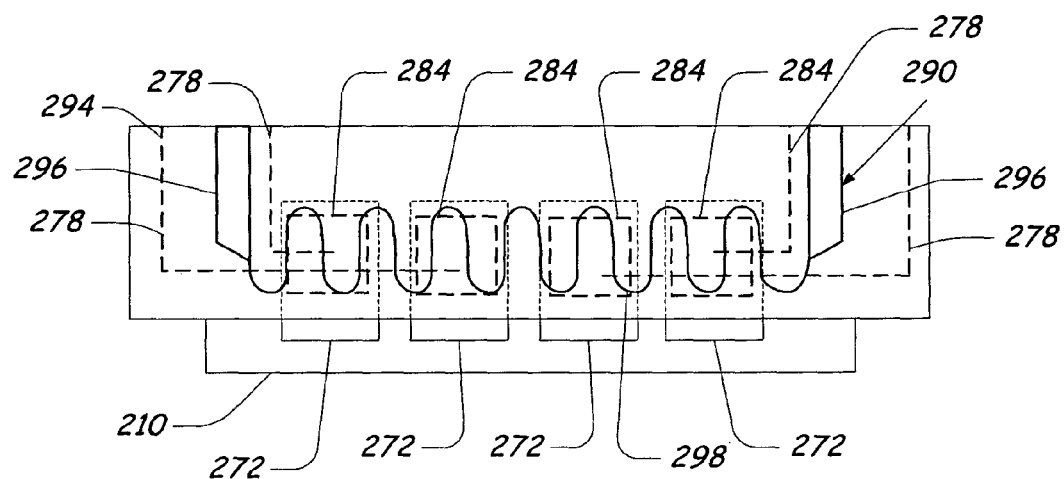

FIGS. 5-1 and 5-2 illustrate an alternative embodiment for a localized heating element. In this embodiment, a slider 210 is provided and a trace 278 is placed on a flexible circuit 258. A heating element 290 is positioned proximate trace 278 and separated from trace 278 by an insulating component 294. Current applied to heating element 290 causes reflow of bonding component 284 and consequently an electrical connection is provided between trace 278 and bond pads 272. As illustrated in FIG. 5-2, heating element 290 includes low resistivity portions 296 and high resistivity portions 298. Again, an undulating pattern is formed within high resistivity portion 298 to increase the surface area for which heat is applied to bonding component 284.

In summary, the present invention provides a suspension assembly (112) having a slider body (110, 210) with a trailing edge face (170). A bond pad (172, 272) is positioned on the trailing edge face (170) and a conductive trace (178, 278) is connected to the bond pad (172, 272) to form an electrical connection. A heating element (190, 290) includes a low resistivity portion (196, 296) and a high resistivity portion (198, 298). The high resistivity portion (198, 298) is positioned proximate the electrical connection.

A method for providing an electrical connection is also provided. The method includes providing a flexible circuit (158, 258). A heating element (190, 290) and a conductive trace (178, 278) are positioned within the flexible circuit (158, 258). Additionally, a slider (110, 210) having a bond pad (172, 272) is provided. The method also includes heating a bonding component (184, 284) to provide an electrical conduit between the conductive trace (178, 278) and the bond pad (172, 272).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the suspension assembly while maintaining substantially the same functionality without departing from the scope and spirit of the present invention. In addition, although the preferred embodiment described herein is directed to a suspension assembly for a data storage system, it will be appreciated by those skilled in the art that the teachings of the present invention can be applied to other suspension assemblies, without departing from the scope and spirit of the present invention.

What is claimed is:

1. A suspension assembly comprising:
   a slider body having a trailing edge face;
   a bond pad positioned on the trailing edge;
   a conductive trace connected to the bond pad to form an electrical connection;
   a heating element including a low resistivity portion and a high resistivity portion, the high resistivity portion positioned proximate the electrical connection; and
   an insulating component positioned between the conductive trace and the heating element proximate the electrical connection.

2. The suspension assembly of claim 1 wherein the high resistivity portion has a thickness smaller than the low resistivity portion.

3. The suspension assembly of claim 1 wherein the high resistivity portion includes an undulating pattern positioned proximate the bond pad.

4. The suspension assembly of claim 1 wherein four bond pads are positioned on the trailing edge face and four conductive traces are connected to the four bond pads to form electrical connections and wherein the high resistivity portion is positioned proximate each of the electrical connections.

5. The suspension assembly of claim 1 wherein the high resistivity portion is positioned in a plane generally perpendicular to the trailing edge face.

6. The suspension assembly of claim 1 wherein the high resistivity portion is positioned in a plane generally parallel to the trailing edge face.

7. The suspension assembly of claim 1 wherein the conductive trace is positioned in a flex circuit.

8. The suspension assembly of claim 7 wherein the conductive trace includes a trace bond pad and a bonding component is positioned on the trace bond pad, the bonding component providing an electrical conduit between the bond pad and the trace bond pad.

9. The suspension assembly of claim 7 wherein the heating element is positioned in the flex circuit.

10. The suspension assembly of claim 9 and further comprising a gimbal assembly attached to the slider.

11. The suspension assembly of claim 1 wherein the heating element is positioned in a flex circuit.

12. The suspension assembly of claim 1 wherein the heating element is adapted to provide heat to a bonding component, the bonding component providing an electrical conduit between the bond pad and the conductive trace.

13. A suspension assembly comprising:
    a suspension;
    a slider body supported by the suspension and having a trailing edge face and at least one bond pad positioned on the trailing edge face; and
    means for providing an electrical connection between a conductive trace and the at least one bond pad using a heating element positioned on the suspension, the heating element having a high resistivity portion and a low resistivity portion.

14. The suspension assembly of claim 13 and further comprising means for insulating the conductive trace and the heating element.

15. The suspension assembly of claim 13 wherein the high resistivity portion has a thickness smaller than the low resistivity portion.

16. The suspension assembly of claim 13 wherein the high resistivity portion includes an undulating pattern.

17. The suspension assembly of claim 13 wherein the high resistivity portion is positioned in a plane generally perpendicular to the trailing edge face.

18. The suspension assembly of claim 13 wherein the high resistivity portion is positioned in a plane generally parallel to the trailing edge face.

19. The suspension assembly of claim 13 wherein the means for providing are positioned on a flex circuit.

20. The suspension assembly of claim 13 and further comprising means for heating a bonding component to provide an electrical conduit between the conductive trace and the at least one bond pad.

21. The suspension assembly of claim 20 wherein the bonding component is positioned on a portion of the conductive trace.

22. A suspension interconnect, comprising:
    a suspension;
    a conductive element positioned on the suspension;
    a heating element positioned on the suspension and including a low resistivity portion and a high resistivity portion, the heating element being adapted to provide heat to a bonding component that provides an electrical conduit; and
    an insulating component positioned between the conductive element and the heating element such that the conductive element and the heating element are electrically isolated.

23. The suspension interconnect of claim 22 wherein the high resistivity portion has a thickness smaller than the low resistivity portion.

24. The suspension interconnect of claim 22 wherein the high resistivity portion includes an undulating pattern.

25. The suspension interconnect of claim 22 wherein at least two bond pads are electrically interconnected to at least two conductive elements.

26. The suspension interconnect of claim 22 and further comprising a flex circuit including the heating element.

* * * * *